(12) United States Patent
Ablett et al.

(10) Patent No.: US 6,463,380 B1
(45) Date of Patent: Oct. 8, 2002

(54) CONTROL SYSTEM AND METHOD FOR CONTROLLING AN ENGINE IN RESPONSE TO DETERIORATION OF THE ENGINE

(75) Inventors: Adrian M. Ablett, Cincinnati, OH (US); Sridhar Adibhatla, West Chester, OH (US); Kiyoung Chung, West Chester, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/323,456

(22) Filed: Jun. 1, 1999

(51) Int. Cl.[7] .................. G06F 15/20; G01M 15/00; F02D 41/22
(52) U.S. Cl. .................. 701/100; 701/29; 340/438; 123/674
(58) Field of Search .................. 701/29, 30, 100, 701/99, 101, 102, 123, 33, 34, 103, 114, 105, 108; 340/438, 439, 457, 457.4; 96/421; 123/674, 688, 691, 690, 480, 406.26

(56) References Cited

U.S. PATENT DOCUMENTS

| | | | | |
|---|---|---|---|---|
| 4,181,944 A | | 1/1980 | Yamauchi et al. | 364/431 |
| 4,249,238 A | | 2/1981 | Spang, III et al. | 364/106 |
| 4,487,016 A | | 12/1984 | Schwarz et al. | 60/204 |
| 4,668,162 A | | 5/1987 | Cederwall et al. | 415/115 |
| 4,843,575 A | * | 6/1989 | Crane | 364/550 |
| 4,856,272 A | | 8/1989 | Putman et al. | 60/39.02 |
| 5,048,445 A | * | 9/1991 | Lever et al. | 114/222 |
| 5,081,830 A | | 1/1992 | Schwarz et al. | 60/39.02 |
| 5,197,280 A | | 3/1993 | Carpenter et al. | 60/204 |
| 5,210,704 A | * | 5/1993 | Husseiny | 364/551.01 |
| 5,255,512 A | | 10/1993 | Hamburg et al. | 60/274 |
| 5,284,347 A | | 2/1994 | Pope | 277/1 |
| 5,559,706 A | * | 9/1996 | Fujita | 364/431.11 |
| 5,606,311 A | * | 2/1997 | Polidan et al. | 340/607 |
| 5,642,284 A | * | 6/1997 | Parupalli et al. | 364/424.035 |
| 5,705,977 A | * | 1/1998 | Jones | 340/457.2 |
| 5,775,089 A | | 7/1998 | Skarvan | 60/39.03 |
| 5,817,958 A | * | 10/1998 | Uchida et al. | 73/865.9 |
| 5,857,163 A | * | 1/1999 | Trombley et al. | 701/101 |
| 5,884,610 A | * | 3/1999 | Reddy | 123/520 |
| 5,931,878 A | * | 8/1999 | Chapin, Jr. | 701/30 |
| 6,067,498 A | * | 5/2000 | Akiyama | 701/110 |
| 6,240,343 B1 | * | 5/2001 | Sarangapani et al. | 701/29 |

FOREIGN PATENT DOCUMENTS

| | | |
|---|---|---|
| EP | 0117313 | 12/1983 |
| GB | 2 162 662 A | 7/1985 |
| GB | 2 162 966 A | 7/1985 |
| GB | 2 218 158 A | 2/1989 |

\* cited by examiner

*Primary Examiner*—Tan Nguyen
*Assistant Examiner*—Dalena Tran
(74) *Attorney, Agent, or Firm*—Nathan D. Herkamp; Cantor & Colburn, LLP

(57) ABSTRACT

An exemplary embodiment of the invention is directed to a control system for controlling an engine. The control system includes a schedule memory for storing a schedule representing target values for a controlled variable. The control system also includes a processor coupled to the schedule memory. The processor receives a reference input and generates a control signal in response to the reference input and the schedule. The schedule in the schedule memory may be updated to account for engine deterioration so that accurate control is performed. Another exemplary embodiment of the invention is a method for controlling an engine. The method includes updating a schedule to account for deterioration of the engine.

10 Claims, 3 Drawing Sheets

CONTROL SYSTEM AND METHOD FOR CONTROLLING AN ENGINE IN RESPONSE TO DETERIORATION OF THE ENGINE

BACKGROUND OF THE INVENTION

The invention relates to a control system and method for controlling an engine and in particular to a control system and method for controlling an engine in response to deterioration of the engine. Existing gas turbine engines utilize digital/electronic engine control systems, often referred to as FADEC (Full Authority Digital Electronic Control). These control systems often include mathematical/computational models of various engine systems, sub-systems, and components. These mathematical/computational models are often used to predict and control the behavior of engine systems, sub-systems, and components. Prediction and control of engine behavior may utilize (1) feedback of actual engine behavior by means of sensors located in various parts of the engine (temperature, pressure, speed, etc.), (2) calculations and predictions of engine system, sub-system, and component behavior and (3) schedules describing desired or target system, sub-system, and component behavior under certain engine operating conditions.

Controlling an engine in this manner allows for improved engine performance and efficiency, which provides significant benefits to the customer/user of the engine, such as lower fuel consumption and extended on-wing engine life (the period of time after which the engine must be removed from operation for overhaul/maintenance). These in turn lead to lower operating costs and a wider more flexible range of operational use by the customer/user.

In order to predict and control engine behavior, the mathematical/computational models include information about the physical properties of the relevant engine systems, sub-systems, and components, such as physical size (dimensions, shape), coefficient of thermal expansion, modulus of elasticity, stiffness, time constants, and other physical, mechanical, and thermal properties. This information about physical properties is typically pre-programmed into the engine control system, and represents the physical condition of the engine system, sub-system, or component when new. During engine operation by the customer/user, changes in the physical properties of the engine systems, sub-systems, and components can occur over time. Examples of such changes are wear and distortion, which change the physical size and/or shape of the engine system, sub-system, or component. Such changes in physical properties often reduce or impair engine performance and efficiency, leading to increased fuel consumption, and reducing engine on-wing life. Unfavorable changes of this nature are referred to as deterioration. As an engine deteriorates and undergoes physical changes over time, the physical properties of the deteriorated engine system, sub-system, or components start to deviate from the new physical properties that were pre-programmed into the engine control system. If direct feedback of the changing physical properties from the engine to the control system is not available (as is the case in contemporary engine control a systems), then the control system cannot account for the physical changes. The resulting deviations between the deteriorated physical properties (in the engine), and the new physical properties (in the control system) introduce discrepancies into the mathematical/computational models. These discrepancies impair the ability of the engine control system to accurately predict and control the behavior of the particular engine system, sub-system, or component. This can result in reduced efficiency and on-wing life, increased fuel consumption, and other unfavorable effects on engine performance.

The deviations between deteriorated and new physical properties are most frequently addressed by physical overhaul and maintenance, in which the physical properties are restored from the deteriorated condition to the new condition. This physical maintenance, sometimes referred to as performance restoration, is achieved either by replacement of the particular engine system, sub-system, or component with new hardware, or by physical processing (repair) of the hardware. However, physical overhaul and maintenance of this type is difficult, time consuming, inconvenient, and expensive. An easier, quicker, less expensive, and more convenient method of addressing the control system deviation between the deteriorated and new conditions would therefore be advantageous.

BRIEF SUMMARY OF THE INVENTION

An exemplary embodiment of the invention is directed to a control system for controlling an engine in response to deterioration of the engine. The control system includes a schedule memory for storing a schedule representing target values for a controlled variable. The control system also includes a processor coupled to the schedule memory. The processor receives a reference input and the controlled variable and generates a control signal in response to the reference input and the schedule. The schedule in the schedule memory may be updated to account for engine deterioration so that accurate control is performed. Another exemplary embodiment of the invention is a method for controlling an engine. The method includes updating a schedule to account for deterioration of the engine.

DETAILED DESCRIPTION OF THE INVENTION

Figure 1:
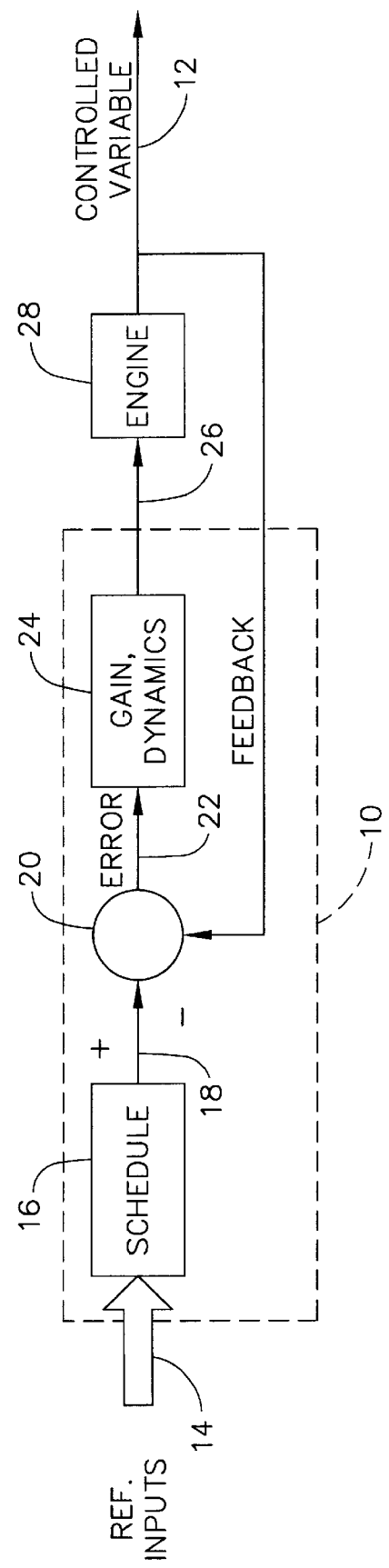
FIG. 1 is a block diagram of a control loop.

FIG. 1 is a block diagram of a closed-loop engine control system representative of control performed in an exemplary embodiment of the invention. A controller 10 interfaces with an engine 28 to control the value of a controlled variable 12. One or more reference inputs 14 are applied to a schedule 16. The schedule 16 provides a target value 18 for the controlled variable 12. A difference between target value 18 and control variable 12 is determined at summer 20 to generate an error signal 22. The error signal is provided to gain dynamics 24 which generates a control signal 26 which is provided to one or more components of the engine 28 to adjust the controlled variable 12.

Figure 2:
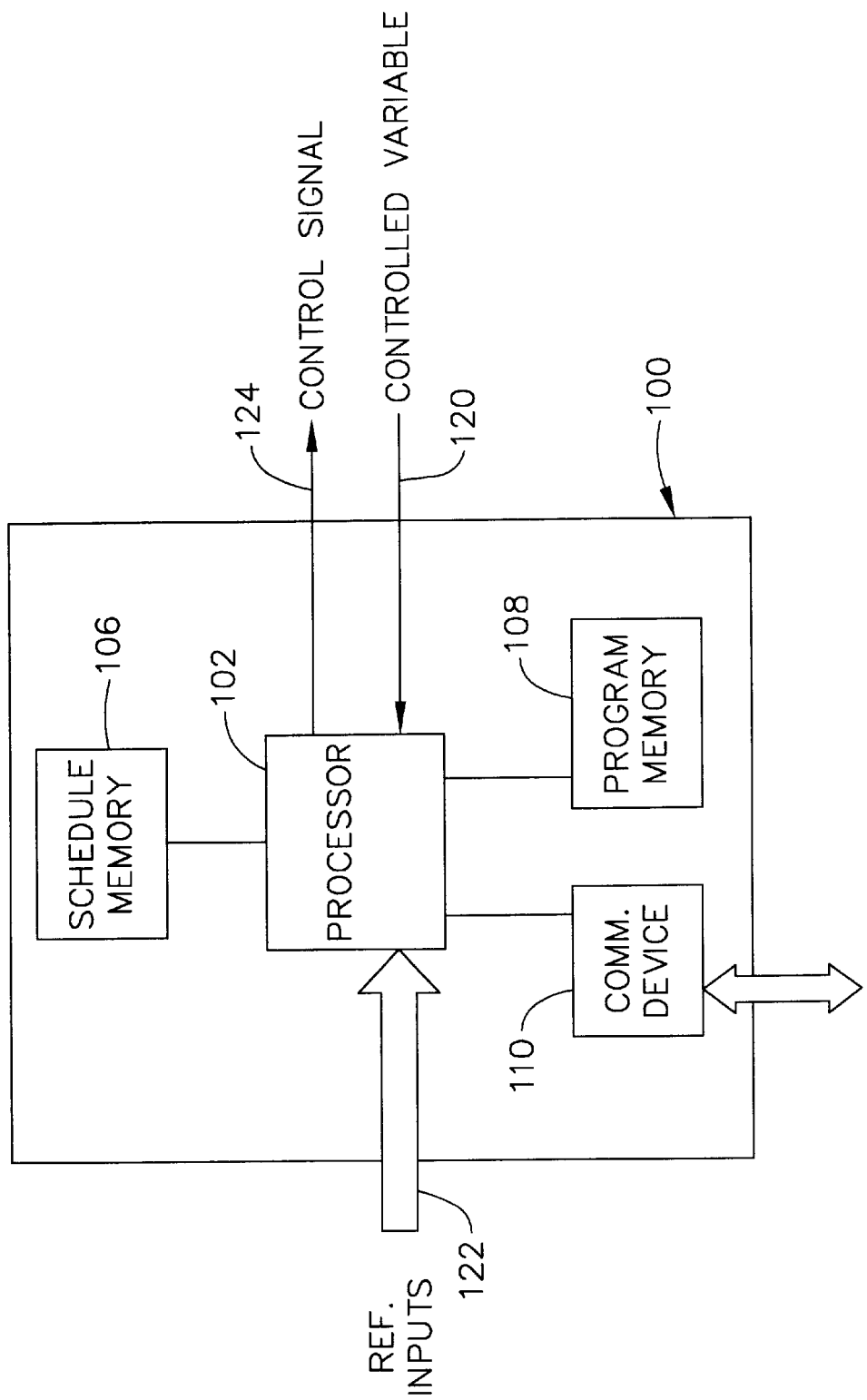
FIG. 2 is a block diagram of a controller in an exemplary embodiment of the invention.

FIG. 2 is a block diagram of an engine control system in an exemplary embodiment of the invention. A controller 100 includes a processor 102 which may be implemented through a microprocessor and associated components (RAM, I/O devices, etc.). The processor 102 is coupled to a schedule memory 106 which contains a schedule representing target values for controlled variables as described above with reference to FIG. 1. The controller 102 is also coupled to a program memory 108 which stores a control program containing instructions to be executed by processor 102. The controller 100 includes a communication device 110 to provide for outside communication with the processor 102 using known techniques (e.g., RS232).

Operation of the controller 100 will now be described. The controller 100 is designed to control a control variable 120. In operation, the processor 102 receives one or more reference inputs 122. The processor 102 compares the reference inputs to the schedule in schedule memory 106 to derive a target value for the controlled variable 120. The processor 102 receives the controlled variable 120 through feedback and determines the difference between the controlled variable 120 and the target value. Based on the difference between the target value and the controlled variable, the processor generates a control signal 124. The control signal 124 is provided to the engine to adjust the control variable 120 to a value equal the target value.

As described above, there exists a deviation between the deteriorated physical properties and the initially programmed new physical properties that occurs over time during engine operation. The control system of FIG. 2 can be updated to compensate for this deviation. A first type of update is storing an updated schedule in schedule memory 106. The schedule memory 106 contains schedules used to derive the target value for the controlled variable. Updating the schedules in schedule memory 106 allows an updated schedule, corresponding to a deteriorated engine, to be stored in memory 106. This will reduce deviation between the target value and the controlled variable due to engine deterioration. A second type of update is storing an updated control program in memory 108. The updated control program may alter computation of the control signal 124 to compensate for deterioration of the engine.

The update of the schedule memory 106 or the program memory 108 may be performed at predetermined service intervals. For example, after 10,000 hours of in-flight use, the engine may be scheduled for service. At this time, the schedule memory 106 and/or the program memory 108 can be updated through communication port 110. The updated schedule and/or updated control program is provided to processor 102 which then stores the updated schedule and/or updated control program in schedule memory 106 or program memory 108. The schedule memory 106 and program memory 108 should be programmable types of memory such as EEPROM, flash memory, etc. It is understood that the schedule memory and program memory may be realized in a single device as opposed to separate devices. Adjustment or re-programming of the control system in this manner is a significantly easier, quicker, less expensive and more convenient method of reducing/eliminating the deviation than physical overhaul and maintenance of the engine.

Figure 3:
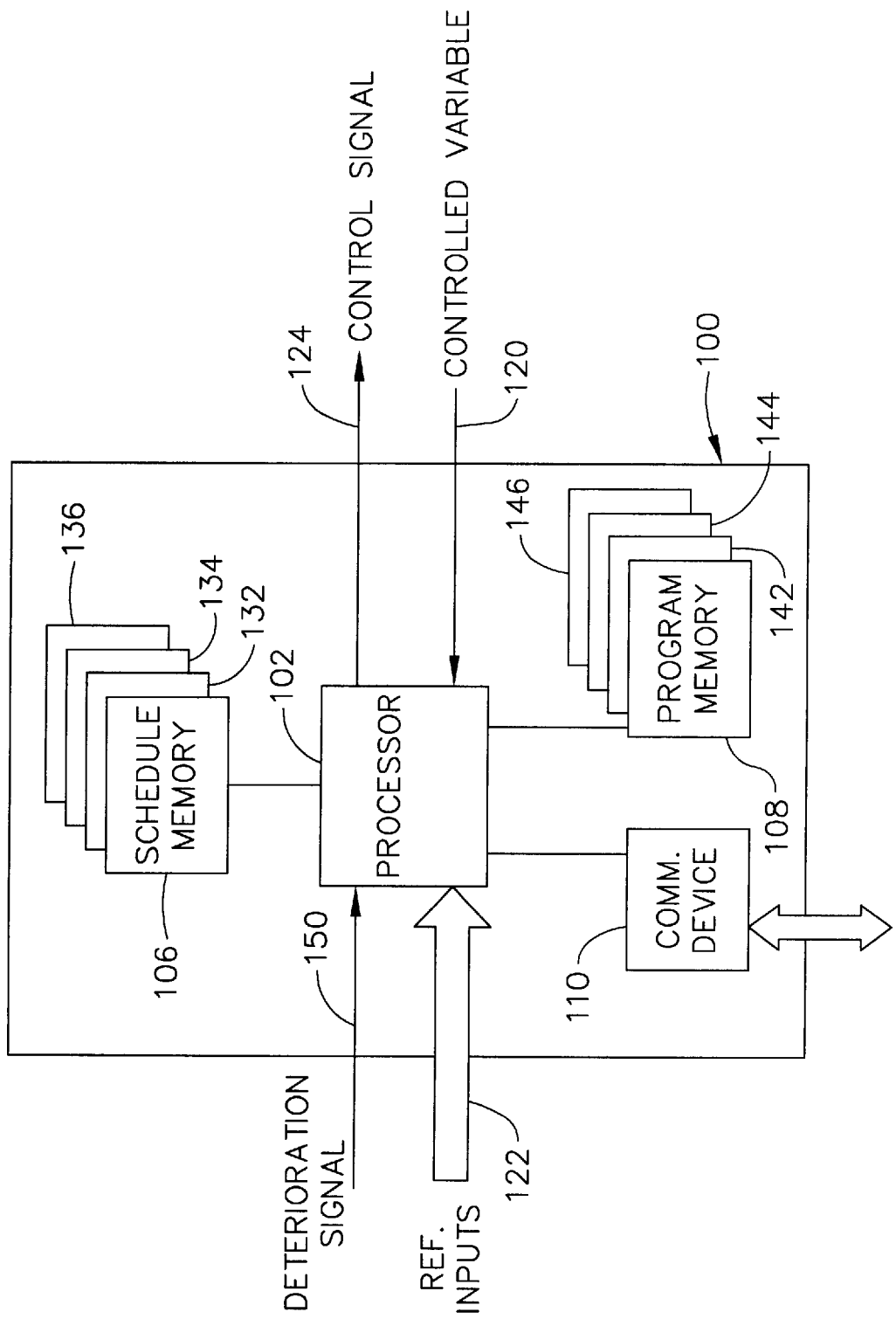
FIG. 3 is a block diagram of a controller in an exemplary embodiment of the invention.

FIG. 3 depicts an alternate embodiment of the invention in which the controller automatically updates the schedule memory 106 and/or the program memory 108. As shown in FIG. 3, the schedule memory 106 includes a plurality of schedules shown as 132, 134 and 136. The program memory 108 includes a plurality of control programs shown as 142, 144 and 146. A deterioration signal 150 is provided to the processor 102 and the processor 102 selects a schedule from schedule memory 106 and/or a control program from memory 108 in response to the deterioration signal 150. For example, the deterioration signal 150 may indicate the number of hours of engine use. Alternatively, the deterioration signal 150 may represent a physical characteristic of the engine. The processor 102 monitors the deterioration signal 150 and performs an update by selecting an appropriate schedule and/or control program. Accordingly, the controller 100 automatically adjusts to account for deterioration when a certain set of conditions are met by the engine. In this case, accounting and correcting/adjusting for deterioration is fully automatic and would require no maintenance action at all.

In either the manual update embodiment of FIG. 2 or the automatic update embodiment of FIG. 3, the change to the schedule or control program should correspond to the physical deterioration of the engine. Determination of the degree of correction/adjustment required, and how best to implement it in the control system, might include, but is not limited to, the following considerations:

1. Knowledge of the deterioration mechanisms or phenomena that affect a particular engine system, subsystem, or component.
2. Experience with or history of the particular engine type.
3. Engine on-wing inspections, such as by borescope.
4. Analysis of engine trending/performance data for the particular engine during revenue service operation by the customer/user.
5. Expected use, environment, and operation of the particular engine by the particular customer/user.

The control system in the exemplary embodiments of the invention helps reduce engine operating costs by reducing fuel consumption, reducing physical as maintenance/overhaul of the engine, extending engine on-wing life and reducing engine downtime. Performance deterioration is reduced and on-wing life is extended with little or no maintenance action required. The invention is applicable to any type of engine (e.g., steam turbine, gas turbine, non-turbine) with a digital/electronic control system, where pre-programmed information about the engine changes or deteriorates over time during operation.

An exemplary application of an embodiment of the invention will be described. HPT blade tip clearance is an important factor in determining the performance, efficiency, fuel consumption, and on-wing life of a gas turbine engine. In order to accurately control HPT blade tip clearance, modern gas turbine engines include an engine system referred to as High Pressure Turbine Active Clearance Control (HPTACC). HPTACC systems include mathematical/computational models of HPT blade tip clearance, and therefore require information about the physical properties of various parts of the system. For many HPTACC systems, an example of one of the properties required is cold engine tip clearance. However, during engine operation by the customer/user, HPT blade tips can experience material loss due to wear, erosion, and other phenomena. This blade tip material loss causes the cold engine tip clearance to increase (deteriorate) over time, resulting in a deviation between the actual (deteriorated) cold engine tip clearance in the engine, and the cold engine tip clearance initially programmed into the engine control system. This deviation impairs the ability of the engine control system to accurately control HPT blade tip clearance, resulting in sub-optimal performance, efficiency, fuel consumption, and engine on-wing life. Deterioration of HPT blade cold engine tip clearance is currently corrected during overhaul by replacement or repair of the engine component (such as the BPT blades and shrouds) that form the tip clearance. Using an embodiment of the invention, the HPT cold engine tip clearance can be stored in schedule memory 106 and updated either manually or automatically so that the control system compensates for changes in the HPT cold engine tip clearance.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the appended claims.

What is claimed is:

1. A control system for controlling an engine, the control system comprising:

a schedule memory storing a schedule representing target values for a controlled variable;

a processor coupled to said schedule memory, said processor receiving a reference input and a feedback signal indicative of said controlled variable, said processor generating a control signal in response to said reference input, said feedback signal, and said schedule; and, a communication device coupled to said processor, said communication device receiving an updated schedule for storage in said schedule memory, said updated schedule representing target values for the controlled variable for a deteriorated engine.

2. The control system of claim 1 further comprising:

a program memory storing a control program, said control program containing instructions executable by said processor;

wherein said communication device receives an updated control program for storage in said program memory, said updated control program containing instructions for control of a deteriorated engine.

3. The control system of claim 2 wherein:

said program memory and said schedule memory are separate devices.

4. A control system for controlling an engine, the control system comprising:

a schedule memory storing a plurality of schedules, each schedule representing target values for a controlled variable, at least one schedule representing target values for the controlled variable for a deteriorated engine; and, a processor coupled to said schedule memory, said processor receiving a deterioration signal and selecting one of said plurality of schedules as a selected schedule in response to said deterioration signal;

said processor receiving a reference input and a feedback signal indicative of said controlled variable, said processor generating a control signal in response to said reference input, said feedback signal, and said selected schedule.

5. The control system of claim 4 further comprising:

a program memory storing a plurality of control programs, each control program containing instructions executable by said processor, at least one control program containing instructions for control of a deteriorated engine;

wherein said processor selects one of said control programs in response to said deterioration signal.

6. The control system of claim 5 wherein:

said program memory and said schedule memory are separate devices.

7. A method for controlling an engine comprising:

storing a schedule representing target values for a controlled variable;

storing a control program, said control program containing instructions;

providing a processor for executing said instructions, said processor receiving a reference input and a feedback signal indicative of said controlled variable, said processor generating a control signal in response to said reference input, said feedback signal, and said schedule; and updating one of said schedule and said control program in response to deterioration of the engine.

8. The method of claim 7 wherein:

said schedule includes a plurality of schedules, each schedule representing target values for a controlled variable, at least one schedule representing target values for the controlled variable for a deteriorated engine; and said updating includes selecting one of said schedules.

9. The method of claim 7 wherein:

said control program includes a plurality of control programs, each control program containing instructions executable by said processor, at least one control program containing instructions for control of a deteriorated engine; and said updating includes selecting one of said control programs.

10. A method of controlling a controlled variable in an engine using a control unit, wherein said control unit comprises a processor, a schedule memory, a communication device, a program memory, a control output, and a signal input, said method comprising:

inputting reference input signals into said control unit;

selecting a target value of said controlled variable from a schedule of target values stored in said schedule memory, said selection being based on said reference input signals;

inputting a feedback signal indicative of said controlled variable;

determining said controlled variable from said feedback signal;

subtracting said controlled variable from said target value to generate an error value;

applying said error value to gain dynamics to generate a control signal;

outputting said control signal to said engine, said outputting including affecting said controlled variable; and when said engine has become deteriorated, replacing said schedule with a substitute schedule, said substitute schedule having target values suitable for controlling a deteriorated engine, said replacing includes selecting said substitute schedule based on at least one of knowledge of deterioration mechanisms or phenomena that affect the engine, history of an engine type corresponding to the engine, engine inspections, analysis of engine trending and performance data for the engine during service, and expected use, environment, and operation of the engine.

* * * * *